(12) United States Patent
Kyono et al.

(10) Patent No.: US 12,065,261 B2
(45) Date of Patent: Aug. 20, 2024

(54) SEGMENTATION-BASED FUEL RECEPTACLE LOCALIZATION FOR AIR-TO-AIR REFUELING (A3R)

(71) Applicant: The Boeing Company, Chicago, IL (US)

(72) Inventors: Trent M. Kyono, Wailuku, HI (US); Jacob Arthur Lucas, Makawao, HI (US); Jason Rock, Seattle, WA (US); Justin Cleve Hatcher, Sumner, WA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 17/579,561

(22) Filed: Jan. 19, 2022

(65) Prior Publication Data

US 2022/0306311 A1   Sep. 29, 2022

Related U.S. Application Data

(60) Provisional application No. 63/165,069, filed on Mar. 23, 2021.

(51) Int. Cl.
*B64D 39/00* (2006.01)
*G05D 1/00* (2006.01)
*G06T 7/11* (2017.01)
*G06T 7/73* (2017.01)

(52) U.S. Cl.
CPC .......... *B64D 39/00* (2013.01); *G05D 1/0094* (2013.01); *G06T 7/11* (2017.01); *G06T 7/73* (2017.01); *G06T 2207/10016* (2013.01)

(58) Field of Classification Search
CPC .. B64D 39/00; G06T 7/11; G06T 7/73; G06T 2207/10016; G06V 10/25; G06V 10/26; G06V 10/462; G06V 10/62; G06V 10/82; G06V 20/58; G06N 3/08
See application file for complete search history.

(56) References Cited

U.S. PATENT DOCUMENTS

| | | | |
|---|---|---|---|
| 6,966,525 B1 * | 11/2005 | Schroeder | B64D 39/00 244/135 A |
| 7,980,512 B1 * | 7/2011 | Speer | C07D 271/113 244/135 A |
| 9,150,310 B1 * | 10/2015 | Bray | B64D 39/00 |

(Continued)

OTHER PUBLICATIONS

European Office Action, Application No. 22154999.1, Dated Nov. 2, 2023, 8 Pages.

(Continued)

*Primary Examiner* — Mary Cheung
(74) *Attorney, Agent, or Firm* — Jordan IP Law, LLC

(57) ABSTRACT

Aspects of the disclosure provide solutions for automated air-to-air refueling (A3R) and assisted air-to-air refueling. Examples include: receiving a video frame; identifying an aircraft to be refueled from within the video frame; segmenting the video frame to generate a segmentation mask matching the aircraft within the video frame; based on at least the segmentation mask, determining a position of a fuel receptacle on the aircraft; determining a position of a boom tip of the aerial refueling boom; and controlling the aerial refueling boom to engage the fuel receptacle based on at least the position of the fuel receptacle and the position of the boom tip.

20 Claims, 11 Drawing Sheets

(56) References Cited

U.S. PATENT DOCUMENTS

| | | | |
|---|---|---|---|
| 10,706,583 B2 | 7/2020 | Lozano | |
| 2007/0023575 A1* | 2/2007 | von Thal | B64D 39/00 244/135 A |
| 2009/0095843 A1* | 4/2009 | Powell | B64D 39/00 244/135 A |
| 2011/0147528 A1* | 6/2011 | Adarve Lozano | H04N 13/139 244/135 A |
| 2014/0042274 A1* | 2/2014 | Hatcher | B64D 39/00 244/135 A |

OTHER PUBLICATIONS

Wilson, et al., "Experimental Validation of a drogue estimation algorithm for autonomous aerial refueling," IEEE International Conference on Robotics and Automation. 2015. 10.1109/ICRA.2015.7139941.

* cited by examiner

SEGMENTATION-BASED FUEL RECEPTACLE LOCALIZATION FOR AIR-TO-AIR REFUELING (A3R)

CROSS-REFERENCE TO RELATED APPLICATION

This application claims the benefit of and priority to U.S. Provisional Application No. 63/165,069, entitled "SEGMENTATION-BASED FUEL RECEPTACLE LOCALIZATION FOR AIR-TO-AIR REFUELING (A3R)", filed Mar. 23, 2021, which is incorporated by reference herein in its entirety.

BACKGROUND

Aerial refueling (air-to-air refueling) is typically performed manually, by a highly-skilled human refueling boom operator. Some arrangements place the human operator behind a window, with a view of the refueling boom and the aircraft to be refueled. This type of arrangement requires the added significant expense of providing accommodation for the human operator in the rear of the refueling platform.

Some arrangements use stereoscopic vision with dual cameras, in which the human operator wears goggles that provide a three-dimensional (3D) view based on the views from the dual cameras. Some other arrangements use light detection and ranging (lidar) or radar to provide supplemental range measurements for the human operator. These latter types of arrangements require additional expensive components.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Aspects of the disclosure provide solutions for automated air-to-air refueling (A3R) and assisted air-to-air refueling. Examples include: receiving a video frame; identifying an aircraft to be refueled from within the video frame; segmenting the video frame to generate a segmentation mask matching the aircraft within the video frame; based on at least the segmentation mask, determining a position of a fuel receptacle on the aircraft; determining a position of a boom tip of the aerial refueling boom; and controlling the aerial refueling boom to engage the fuel receptacle based on at least the position of the fuel receptacle and the position of the boom tip. Some examples include, based on at least determining that controlling the aerial refueling boom to engage the fuel receptacle is outside of safety parameters, generating an alert. For some examples, the video frame is monocular (e.g., provided by a single camera).

BRIEF DESCRIPTION OF THE DRAWINGS

The disclosed examples are described in detail below with reference to the accompanying drawing figures listed below.

Corresponding reference characters indicate corresponding parts throughout the drawings in accordance with an example.

DETAILED DESCRIPTION

Figure 1A:
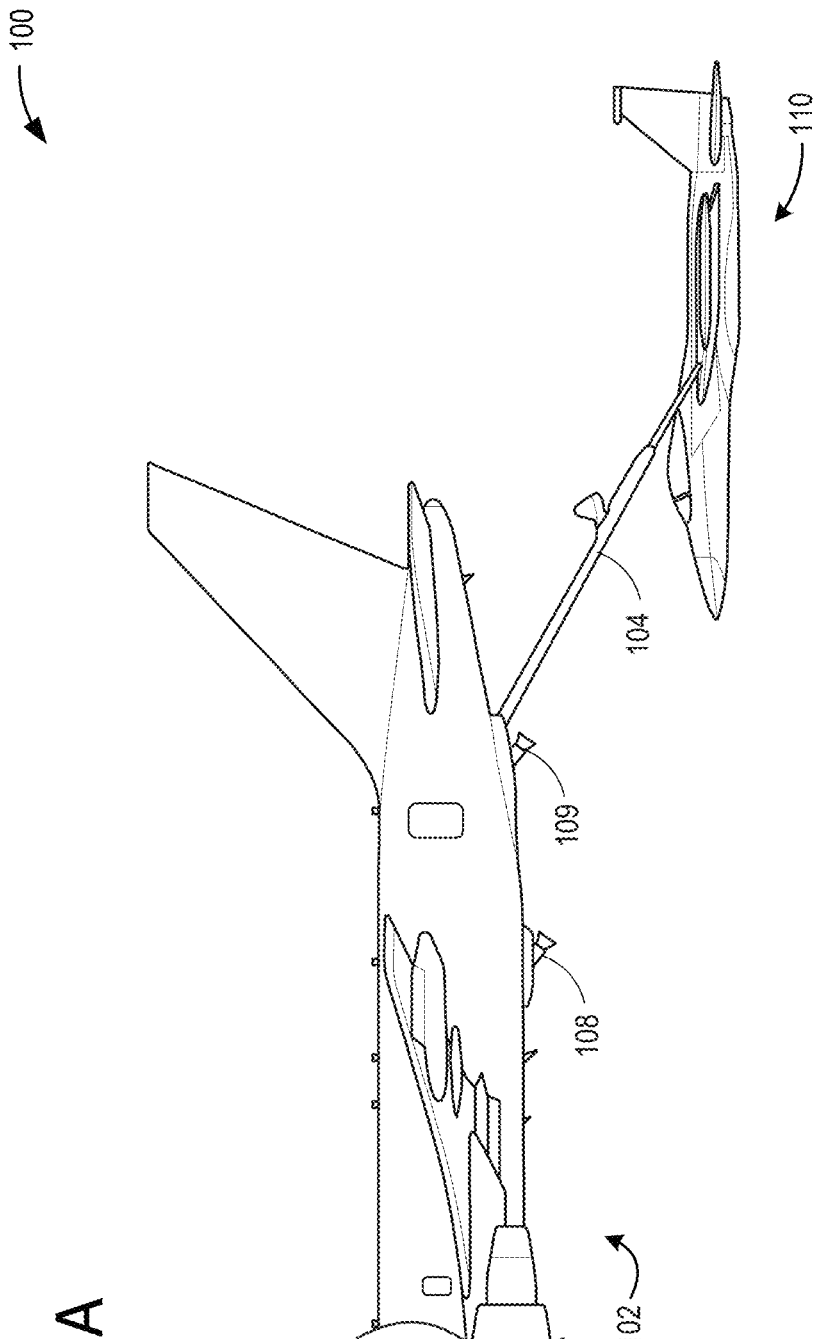
FIG. 1A illustrates an arrangement 100 that advantageously employs segmentation-based fuel receptacle localization for automated air-to-air refueling (A3R) and assisted air-to-air refueling, in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects of the disclosure provide solutions for automated air-to-air refueling (A3R) and assisted air-to-air refueling. Examples include: receiving a video frame; identifying an aircraft to be refueled from within the video frame; segmenting the video frame to generate a segmentation mask matching the aircraft within the video frame; based on at least the segmentation mask, determining a position of a fuel receptacle on the aircraft; determining a position of a boom tip of the aerial refueling boom; and based on at least the position of the fuel receptacle and the position of the boom tip, controlling the aerial refueling boom to engage the fuel receptacle. Some examples include controlling the aerial refueling boom to engage the fuel receptacle based on at least the position of the fuel receptacle and the position of the boom tip. Some examples include, based on at least determining that controlling the aerial refueling boom to engage the fuel receptacle is outside of safety parameters, generating an alert. For some examples, the video frame is monocular (e.g., provided by a single camera).

Aspects of the disclosure have a technical effect of improved operation of a computer, for example by reducing distance calculations, improving the efficiency of computational hardware, and provide better allocation of resources, as compared to traditional systems that rely on, for example processing many different measurement inputs. For example, aspects herein improve the operation of a computer by reducing the computation time (e.g., speed improvement). For example, a machine learning approach offloads pattern recognition tasks to a graphics processing unit (GPU), instead of a central processing unit (CPU).

Aspects of the disclosure are able to estimate the position of a three-dimensional object (e.g., an aircraft fuel receptacle) in a video stream collected by a single camera, such as in support of autonomous aerial refueling operations and/or human-assisted aerial refueling operations. For example, aspects of the disclosure locate the relative positions of an aircraft fuel receptacle and a refueling platform's refueling boom in order to automate control of the refueling boom during refueling. In some examples, position and pose information is represented as six degrees-of-freedom (6DoF) including the three-dimensional (3D) position (x, y, and z coordinates) and orientation (roll, pitch, and yaw).

A continuous surface (e.g., the surface of an aircraft to be refueled or an aerial refueling boom) may be matched in position, in a video frame, with a segmentation mask, for example, a semantic segmentation mask. Semantic segmentation refers to the process of linking each pixel in an image (e.g., the video frame) with a class label, such as aircraft, boom, or background. Some examples use a convolutional neural network (CNN), such as a residual neural network (ResNet) to segment the video frame.

A predicted two-dimensional (2D) mask may be generated using a 3D object model at an estimated location, and with an estimated pose (e.g., 6DoF position), as viewed by a single camera. The position estimation may be accomplished using machine learning (ML), such as with a neural network (NN), a U-Net CNN, or with a perspective n-point (PnP) algorithm, and some examples may also fuse predicted keypoints to assist the position determination. For example, a fully convolutional NN (FCNN) may be trained to map an image of an object of interest (e.g., fuel receptacle or refueling boom) to a binary mask with the location of the feature denoted by a Gaussian distribution centered on the feature. In some examples, a U-Net CNN (e.g., a feature extractor CNN) may be used.

When the mask produced by the estimated 6DoF position matches the segmentation results of the video frame, the estimated 6DoF may be taken as the determined 6DOF position of the object, either the aircraft or the boom. The mask may be used to correct fiducial offsets (see FIG. 1C for an example of a fiducial marker). The mask provides a continuous surface for gradient descent to fit, and additionally offers flexibility for handling various configurations of aircraft seeking refueling.

Some examples further use temporal filtering, such as a Kalman filter, or an ML model, to temporally filter and stabilize position data, to improve localization accuracy. Some examples incorporate available auxiliary sensor data such as light detection and ranging (lidar), radar, or another type of proximity sensor. Some examples may be able to process 20 frames per second, or more, with available computational hardware.

Referring more particularly to the drawings, FIG. 1A illustrates an arrangement 100 that includes a refueling platform 102 and an aircraft 110 to be refueled. In the arrangement 100, the refueling platform 102 uses an aerial refueling boom 104 to refuel the aircraft 110. In certain examples, one or more of the platform 102 or aircraft 110 may be manned or unmanned.

A camera 108 provides a video stream 202a (shown in FIG. 2) for use in determining positions of a boom tip 106 (shown in FIG. 1C) of the aerial refueling boom 104 and a fuel receptacle 116 (shown in FIG. 1C) of the aircraft 110. A proximity sensor 109 (e.g., lidar or radar) is also shown. For some examples of the arrangement 100, a computer vision (CV) architecture 200 (shown in FIG. 2) fuses proximity sensor measurements from the proximity sensor 109 with position information of the aircraft 110 (determined as described herein) to determine a position of the fuel receptacle 116 on the aircraft 110.

Figure 1B:
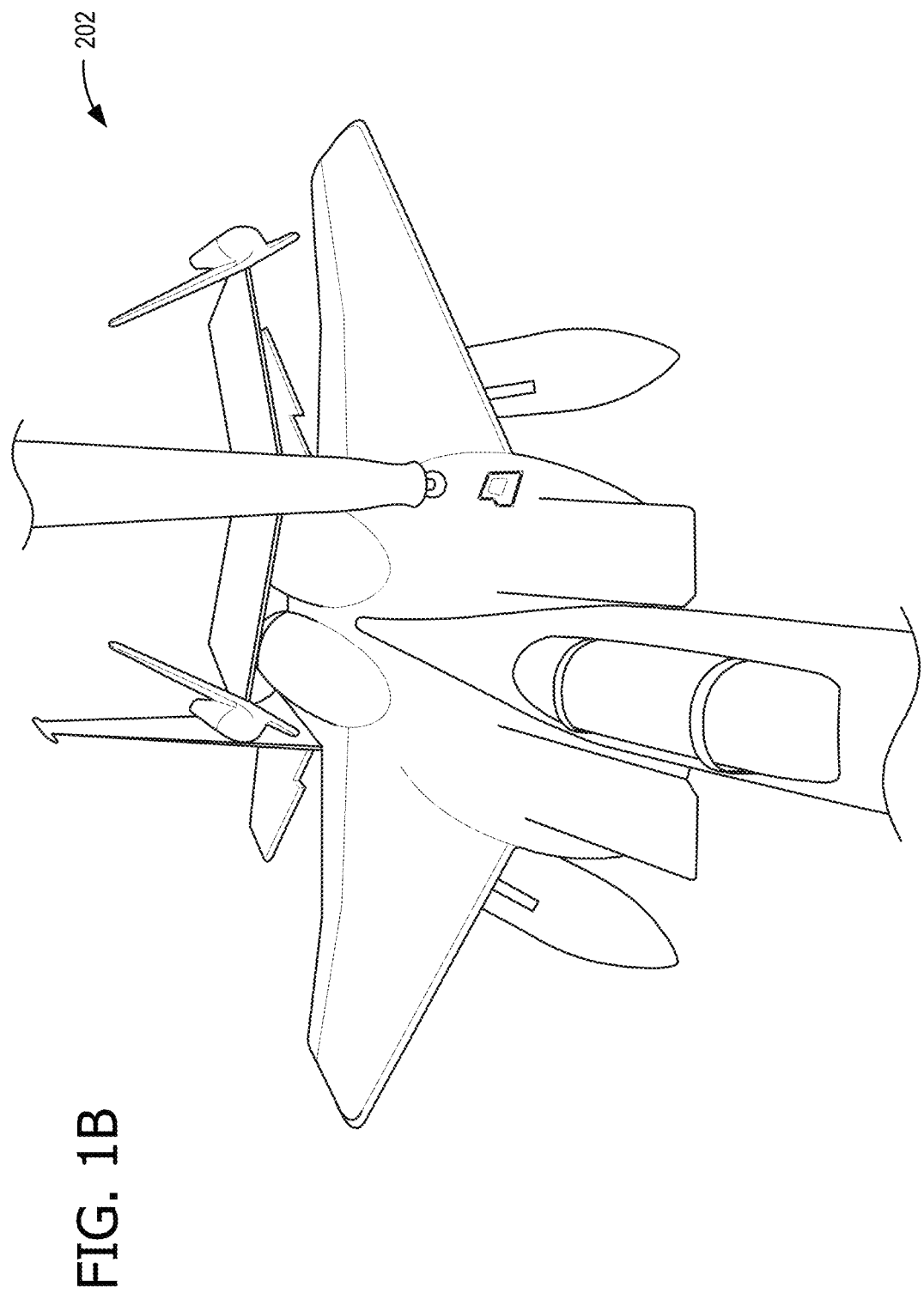
FIG. 1B illustrates a representative video frame 202 from a camera 108 in the arrangement 100, in accordance with an example.
Figure 1C:
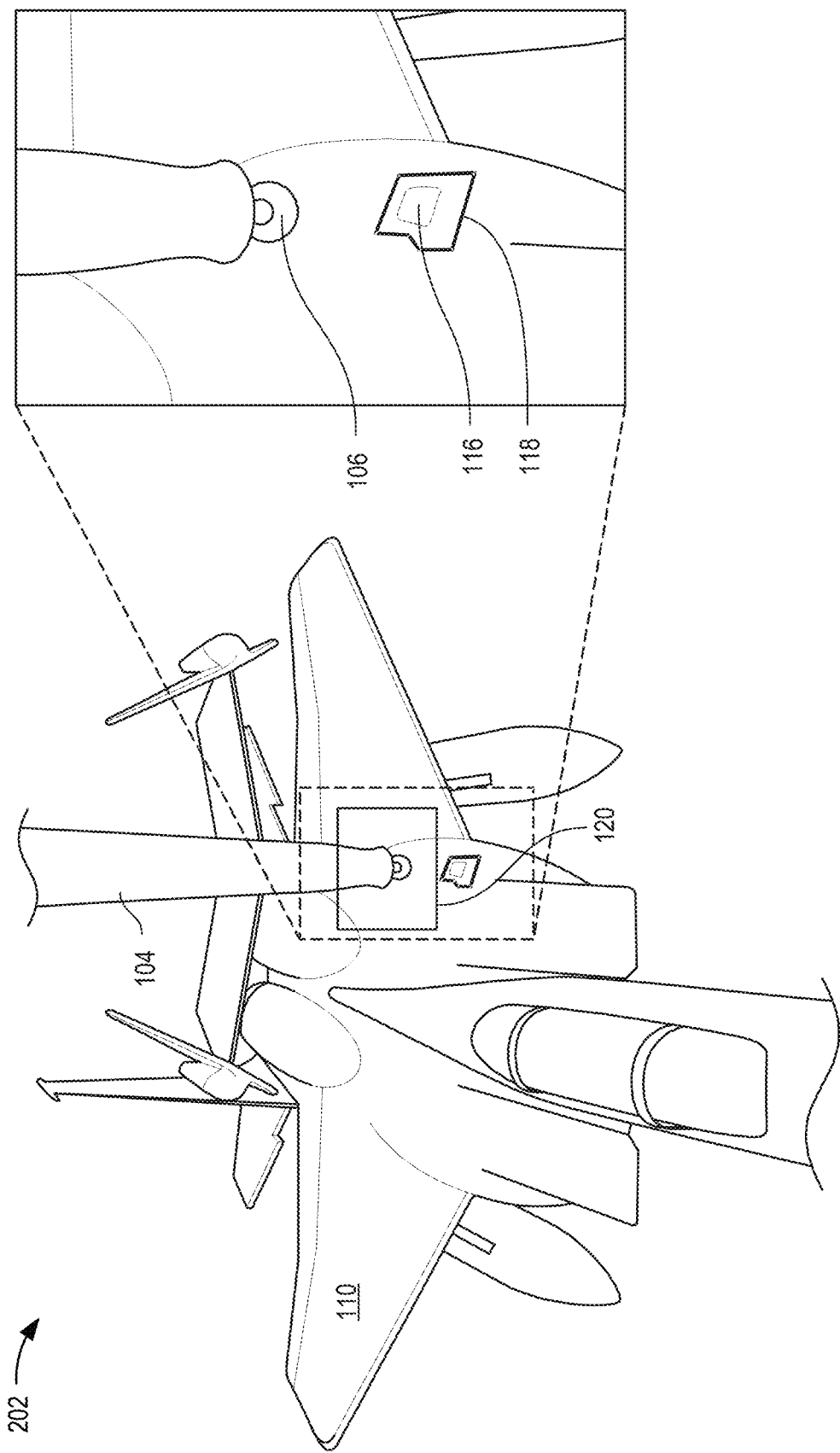
FIG. 1C provides an annotated version of FIG. 1B, identifying various elements.

FIG. 1B illustrates a representative video frame 202, which is a frame from the video stream 202a, captured by the camera 108. For clarity, FIG. 1B shows only a clean version of the video frame 202. FIG. 1C provides an annotated version of the video frame 202, identifying various elements such as the aircraft 110 and the aerial refueling boom 104. An expended view section identifies the boom tip 106, the fuel receptacle 116, and a fiducial marker 118 that outlines the fuel receptacle 116. In operation, the aerial refueling boom 104 delivers fuel to the aircraft 110 by the boom tip 106 engaging the fuel receptacle 116.

The fiducial marker 118 has a defined location relative to the fuel receptacle 116 that facilitates location of the fuel receptacle 116 on the aircraft 110. In some examples, the fiducial marker 118 may be used by elements of the CV architecture 200, specifically a CNN within an aircraft position estimation pipeline 300 (shown in FIGS. 2 and 3) as a reference aid for locating the fuel receptacle 116. The video frame 202 also shows a boom tip bounding box 120, which is used to crop the video frame 202 to the area around the boom tip 106 for image-based location of the boom tip 106. A bounding box may also be used for cropping the video frame 202 to the area around the aircraft 110 in an early stage of the aircraft position estimation pipeline 300.

Figure 2:
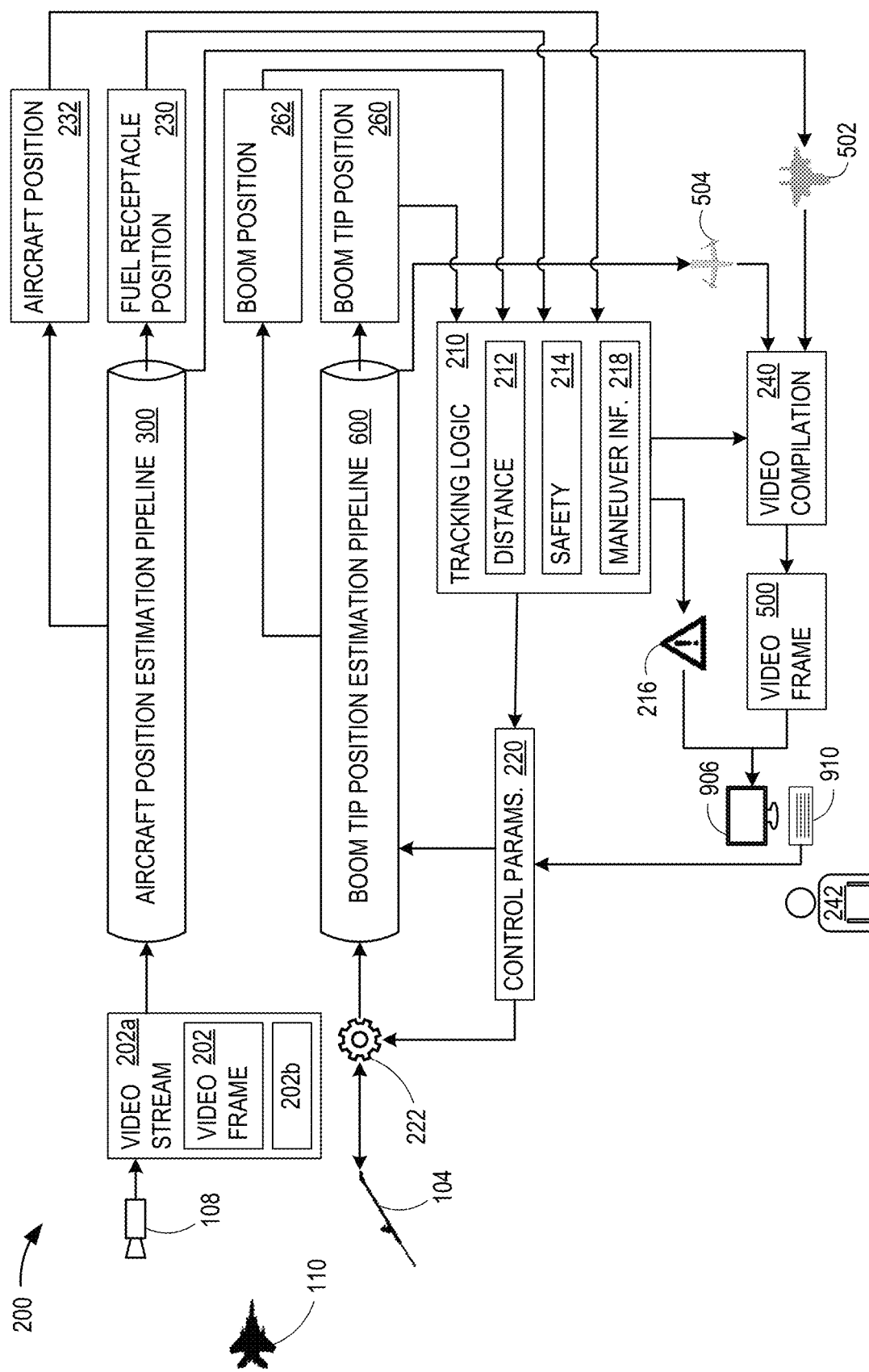
FIG. 2 illustrates a computer vision (CV) architecture 200 that may be used in the arrangement 100, in accordance with an example.

FIG. 2 illustrates the CV architecture 200 that determines the position of the fuel receptacle 116 on the aircraft 110 in the arrangement 100. Various components of the CV architecture 200 are shown with further detail in FIGS. 3 and 4, and the operation of CV architecture 200 is described in further detail in relation to FIGS. 6 and 7, using flowcharts 600 and 700, respectively. In some examples, the entirety of the CV architecture 200 resides on-board the refueling platform 102. In some examples, portions of the CV architecture 200 operate remotely, off of the refueling platform 102.

The CV architecture 200 receives the video stream 202a of the aircraft 110 from the camera 108. The video stream 202a includes the video frame 202 and a plurality of additional video frames 202b. Operation of the CV architecture 200 is described in relation to processing the video frame 202. Processing of each of the plurality of additional video frames 200b is similar to that for the video frame 202.

The CV architecture 200 includes the aircraft position estimation pipeline 300 and a boom tip position estimation pipeline 400. The aircraft position estimation pipeline 300 is shown and described in further detail in relation to FIG. 3. The boom tip position estimation pipeline 400 is shown and described in further detail in relation to FIG. 4.

The aircraft position estimation pipeline 300 receives the video stream 202a and outputs a fuel receptacle position 230. In some examples, the fuel receptacle position 230 is provided as 6DoF. In some examples, the aircraft position estimation pipeline 300 also outputs an aircraft position 232, which may also be provided as 6DoF. An aircraft type identification (ID) 324 may be provided as an input to the aircraft position estimation pipeline 300 (see FIG. 3), which may be input by a human operator 242 or derived from refueling scheduling information. The fuel receptacle position 230 is derivable from the aircraft position 232, because the type of aircraft 110 is known (e.g., by the aircraft type ID 324) and the position of the fuel receptacle 116 on the aircraft 110 is fixed and known. Further detail is provided in the description of FIG. 3.

Similarly, the boom tip position estimation pipeline 400 outputs a boom tip position 260, which may be provided as 6DoF. In some examples, the boom tip position estimation pipeline 400 also outputs a boom position 262, which may also be provided as 6DoF. The boom tip position 260 is derivable from the boom position 262 (and the reverse), because the position of the boom tip 106 on the aerial refueling boom 104 is fixed and known.

The fuel receptacle position 230 and the boom tip position 260 are provided to a tracking logic 210 that determines a distance 212 between the boom tip 106 and the fuel receptacle 116, which are both shown in FIG. 1C. The tracking logic 210 determines boom control parameters 220, which are provided to a boom control 222 that autonomously (or by a human operator) moves the aerial refueling boom 104 to position the boom tip 106 to engage the fuel receptacle 116. That is, boom control 222 controls the aerial refueling boom 160 to engage the fuel receptacle 116. In some examples, the tracking logic 210 also determines whether controlling the aerial refueling boom 104 to engage the fuel receptacle 116 is within safety parameters 214, and if not, generates an alert 216. In some examples, the tracking logic 210 also generates and provides, to the aircraft 110 (e.g., for a pilot or to an unmanned aerial vehicle (UAV)), maneuvering information 218 to facilitate engaging the fuel receptacle 116 with the aerial refueling boom 104 and/or to avoid an unsafe condition.

Boom control parameters 220 include variables that describe how the aerial refueling boom 104 may move (e.g., roll, pitch, yaw, translate, telescope, extend, retract, pivot, rotate, and the like) and may include limits and rates of such movement. The boom control parameters 220 may control the aerial refueling boom 104 given constraints of the boom pivot position and camera intrinsic and extrinsic parameters (e.g., camera parameters 664, shown in FIG. 4), for example, how to rotate the aerial refueling boom 104 (roll and pitch) and telescopically extend the aerial refueling boom 104 so that the 3D position of the boom tip 106 will be projected onto the video frame 202 where the boom tip keypoint 414 (also shown in FIG. 6) is detected.

Figure 5:
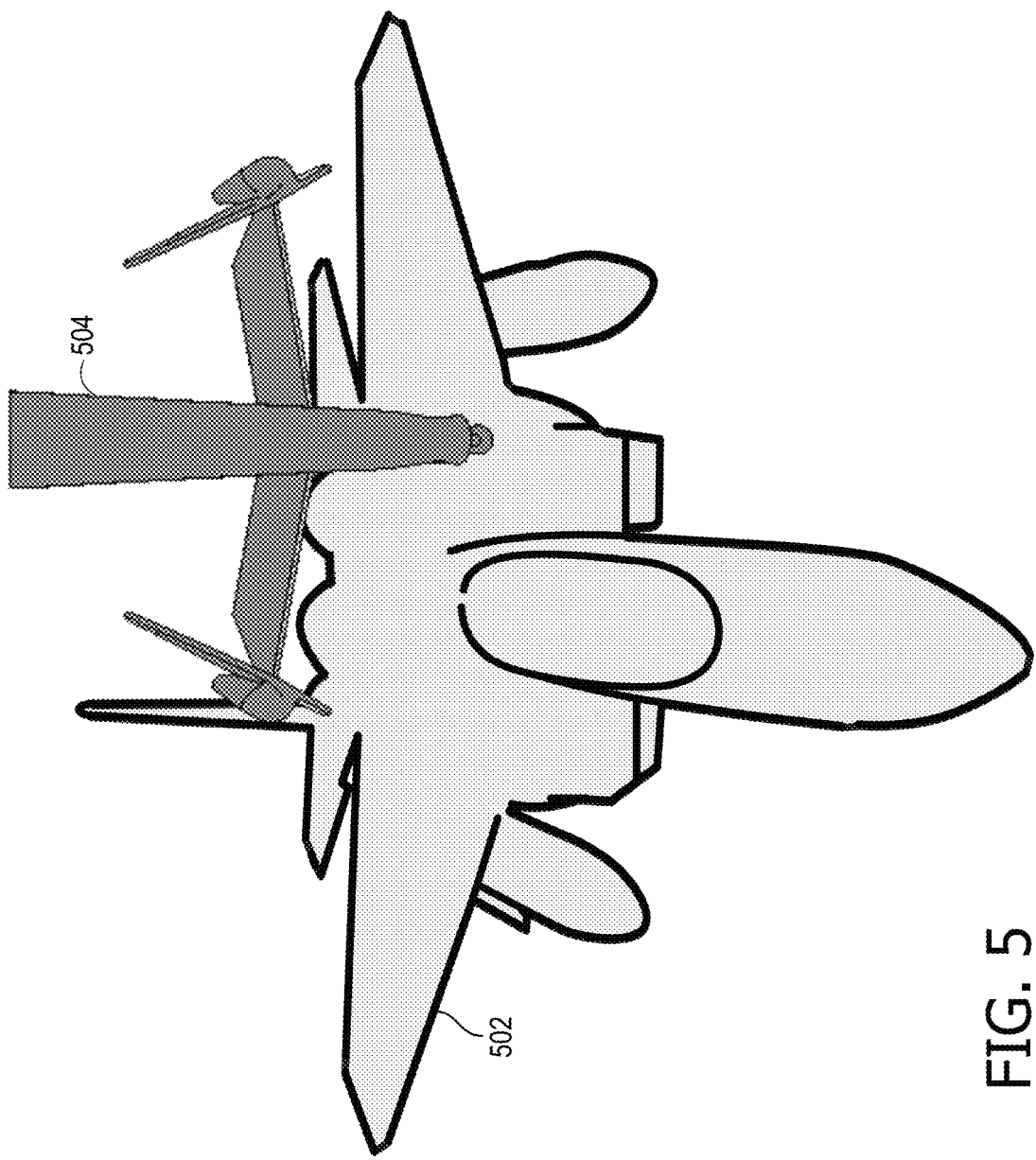
FIG. 5 illustrates a video frame 500, in which an aircraft model projection 502 and a boom model projection 504 are overlaid, in accordance with an example.

In some examples, a video compilation 240 overlays an aircraft model projection 502 and/or a boom model projection 504 onto the video frame 202 to produce an overlaid video frame 500. An example video frame 500 is shown in FIG. 5. In some examples, the video frame 500 and/or the alert 216 are provided to the human operator 242 over presentation components 806 (e.g., by displaying the video frame 500 on a video monitor screen). In some examples, the human operator 242 uses input/output (I/O) components 810 (e.g., a joystick, mouse, keyboard, touchscreen, keypad, and/or other input devices) to provide the boom control parameters 220 to control the aerial refueling boom 104 to position the boom tip 106 to engage the fuel receptacle 116.

Figure 3:
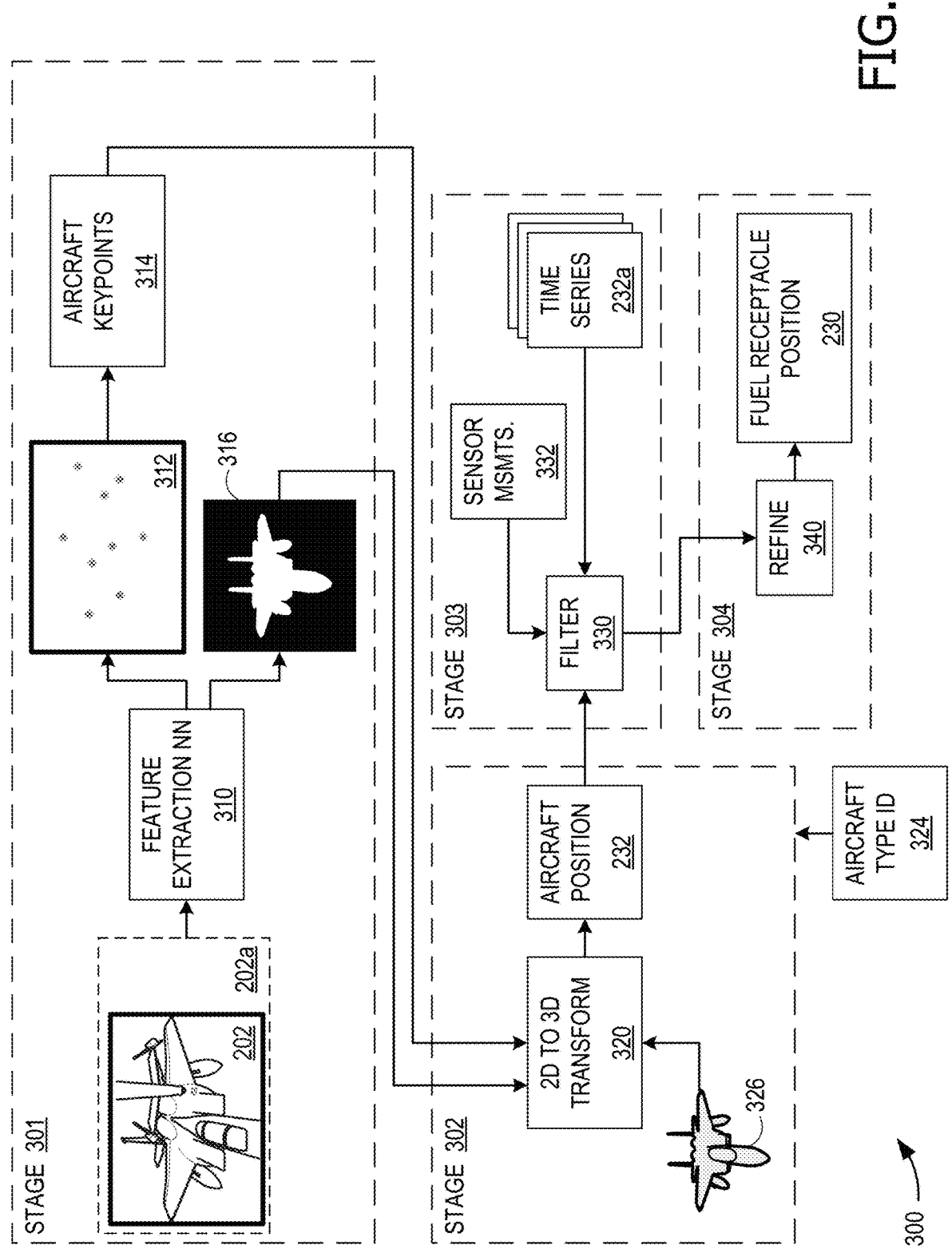
FIG. 3 illustrates a block diagram of an aircraft position estimation pipeline 300 in the CV architecture 200 of FIG. 2, in accordance with an example.

FIG. 3 illustrates further detail for the aircraft position estimation pipeline 300, showing the aircraft position estimation pipeline 300 as comprising four stages: a stage 301, a stage 302, a stage 303, and a stage 304. In the stage 301, the video frame 202 is provided (as part of the video stream 202a) to a feature extraction network 310 (e.g., an NN, such as a CNN). The feature extraction network 310 identifies, within the video frame 202, the aircraft 110 and generates a segmentation mask 316 matching the aircraft 110 within the video frame 202 (e.g., matching a 2D location in the video frame 202 that corresponds to the 6DoF position of the aircraft 110 within the field of view of the camera 108).

In some examples, the feature extraction network 310 also outputs an aircraft keypoint heatmap 312 containing a set of aircraft keypoints 314. A heatmap is a graphical representation of data that uses a system of color-coding to represent different values. Heatmap pixel values indicate, for each keypoint, the likelihood of a 3D object's keypoint being found at each pixel location of the image. In some examples, the keypoints are not represented as binary points, but rather as probabilistic distributions. That is, each of the keypoints corresponds to a region of pixels, with the values of the pixels dropping according to a probability density function (pdf), with increasing distance from the center of the region. In some examples, the maximum value of a pixel, in a keypoint region of pixels, reflects a confidence level of that keypoint.

The segmentation mask 316 is provided to an aircraft 2D to 3D transform 320 in the stage 302. The aircraft 2D to 3D transform 320 determines the aircraft position 232 of the aircraft 110 by fitting the segmentation mask 316 to what would be expected for the 3D aircraft model 326 in a particular pose and location (e.g., 6DoF). The fuel receptacle position 230 will be determined from the aircraft position 232 in the stage 304. In some examples, the aircraft 2D to 3D transform 320 determines the fuel receptacle position 230 directly. The aircraft type ID 324 is used to select a 3D aircraft model 326 (e.g., a computer-aided design (CAD) model) that matches the aircraft 110. In some examples, the aircraft type ID 324 is automatically recognized by the stage 301, using object recognition. The aircraft 2D to 3D transform 320 uses the 3D aircraft model 326 to generate an aircraft model projection 502, rendered according to the aircraft position 232. In some examples, the aircraft 2D to 3D transform 320 also generates the aircraft model projection 502 that is used by the video compilation 240. In some examples, the set of aircraft keypoints 314 (e.g., in the form of the aircraft keypoint heatmap 312) is also provided the aircraft 2D to 3D transform 320. In such examples, determining the position of the fuel receptacle 116 on the aircraft 110 comprises fusing position information of the set of aircraft keypoints 314 with position information of the segmentation mask 316.

In some examples, the aircraft 2D to 3D transform 320 uses a PnP algorithm. PnP algorithms estimate the pose of a calibrated camera relative to an object, given a set of N 3D points on the object and their corresponding 2D projections in an image collected by the camera. PnP algorithms leverage the correspondences between the 2D pixel locations of detected keypoints and 3D keypoint locations on an object model to rotate and position the object in space such that the camera's view of the 3D keypoints matches the 2D pixel locations The stage 303 uses a filter 330 to perform temporal filtering of the aircraft position 232 (or the fuel receptacle position 230, if the aircraft 2D to 3D transform 320 determines the fuel receptacle position 230 directly or if the stage 304 precedes the stage 303). The temporal filtering comprises Kalman filtering that performs time-domain filtering across a time-series set of aircraft positions 232a (or fuel receptacle positions). Kalman filtering uses a series of measurements observed over time, containing statistical noise and other inaccuracies, and produces estimates of unknown variables that tend to be more accurate than those based on a single measurement alone, by estimating a joint probability distribution over the variables for each timeframe. Thus, in some examples, the filter 330 operates across video frames (e.g., the video frame 202 and the plurality of additional video frames 202b). In some examples, aircraft keypoints 314 are also temporally filtered, separately.

In some examples, the filter 330 also fuses proximity sensor measurements 332 of the aircraft 110, received from the proximity sensor 109. In such examples, determining the position of the fuel receptacle 116 on the aircraft 110 comprises fusing the proximity sensor measurements 332 of the aircraft 110 with image-derived data of the aircraft 110 (e.g., the segmentation mask 316, the aircraft keypoints 314, the aircraft position 232, and/or the fuel receptacle position 230). To accomplish this, in some examples, the filter 330 uses its own trained network (e.g., an NN) to incorporate the proximity information into the filtering process.

Once the aircraft position 232 is known, in the stage 304, the fuel receptacle position 230, which is in a predetermined location on the aircraft 110, may be determined using a position refinement algorithm 340 that uses the known position of the fuel receptacle 116 on the aircraft 110. In some examples, the fuel receptacle position 230 is further filtered with a temporal filter (which may be a Kalman filter). In some examples, the stage 304 precedes the stage 303. In some examples, such as when the aircraft 2D to 3D transform 320 determines the fuel receptacle position 230 directly, the stage 304 is not needed.

The feature extraction network 310, the aircraft 2D to 3D transform 320, and the filter 330 are initially trained offline, prior to deployment, although some examples may employ on-going training during deployment. In some examples, the training uses approximately 20,000 labeled training images, generated by sweeping across ranges of 6DoF variations for the aircraft model 326. To increase variations in the datasets used for NN training, data augmentations may be randomly applied to each image passed to the NN. These augmentations include: brightness scaling, contrast scaling, image size scaling, and image translation, among others.

Figure 4:
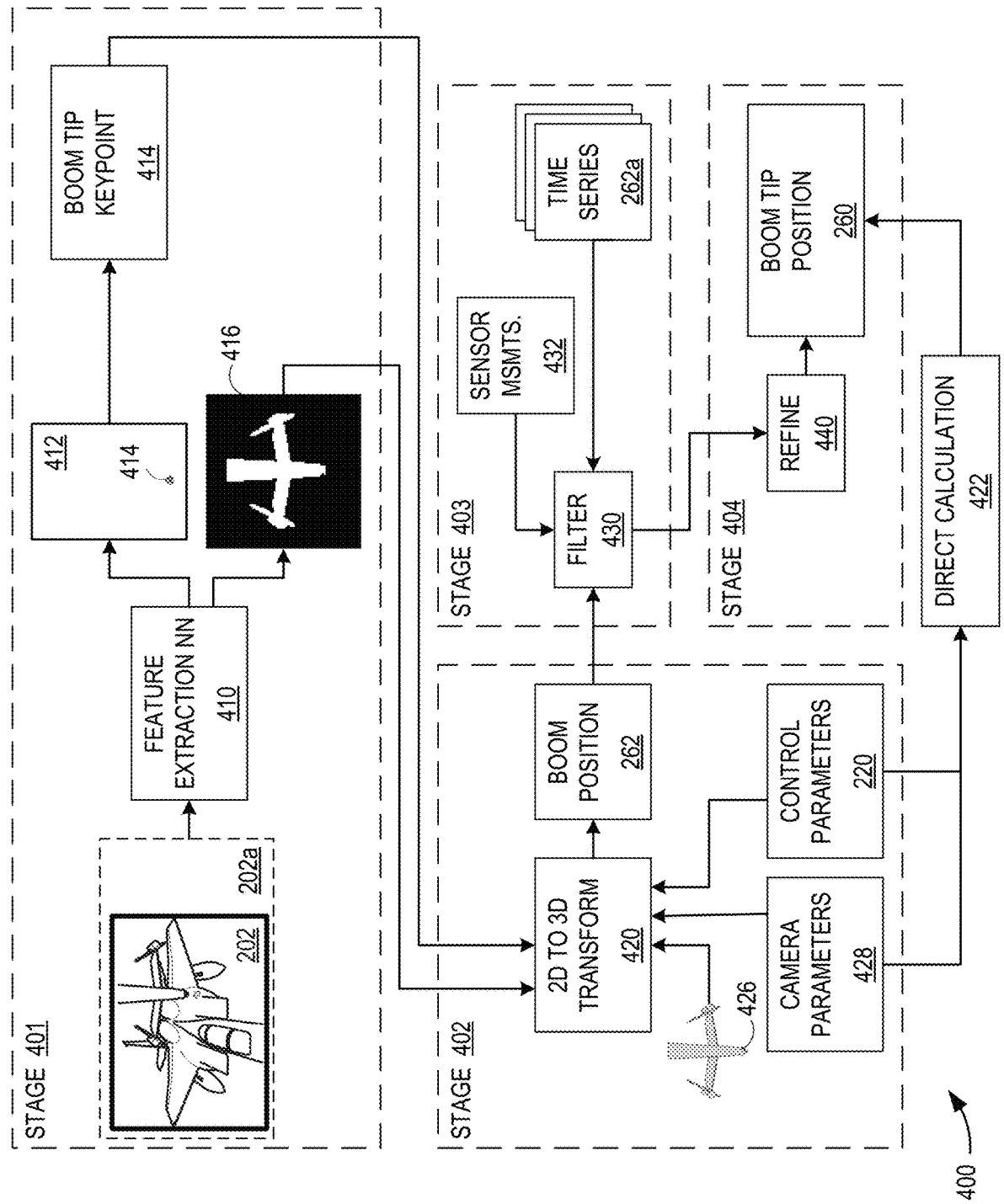
FIG. 4 illustrates a block diagram of a boom tip position estimation pipeline 400 in the CV architecture 200 of FIG. 2, in accordance with an example.

FIG. 4 illustrates further detail for the boom tip position estimation pipeline 400 in the CV architecture 200 of FIG. 2. Different classes of operations are possible with the illustrated boom tip position estimation pipeline 400. In one class of operation, the boom model 426, the camera parameters 428 (e.g., extrinsic and intrinsic parameters for the camera 108), and the boom control parameters 220 are input into a direct calculation 422 to calculate the boom tip position 260, from the physical geometry of the aerial refueling boom 104 and the refueling platform 102, rather than determining the boom tip position 260 from the video stream 202a. In some examples, the boom model 426 comprises a CAD model of the aerial refueling boom 104.

This approach uses the known angles, extrinsics, and geometry of the aerial refueling boom 104 in relation to the camera 108 to determine a projection of the aerial refueling boom 104. By monitoring at each video frame the pitch and roll states of the boom control 222, the pitch and roll of the aerial refueling boom 104 in relation to the camera 108 is determinable at the time of each image (e.g., each video frame) capture. Since the intrinsics of the camera 108 and its position on the refueling platform 102 are known, the location of the aerial refueling boom 104 in the 2D pixel space of the camera 108 may be determined.

Camera parameter information includes the parameters used in a camera model to describe the mathematical relationship between the 3D coordinates of a point in the scene from which the light comes from and the 2D coordinates of its projection onto the image plane. Intrinsic parameters, also known as internal parameters, are the parameters intrinsic to the camera itself, such as the focal length and lens distortion. Extrinsic parameters, also known as external parameters or camera pose, are the parameters used to describe the transformation between the camera and its external world. The camera extrinsic information, resolution, magnification, and other intrinsic information are known.

In an alternative operation, boom tip position estimation pipeline 400 operates similarly as the aircraft position estimation pipeline 300, and comprises four stages: a stage 401, a stage 402, a stage 403, and a stage 404. In the stage 401, the video frame 202 is provided (as part of the video stream 202a) to a feature extraction network 410 (e.g., an NN, such as a CNN). The feature extraction network 410 identifies, within the video frame 202, the aerial refueling boom 104 and generates a segmentation mask 416 matching the aerial refueling boom 104 within the video frame 202 (e.g., matching a 2D location in the video frame 202 that corresponds to the 6DoF position of the aerial refueling boom 104 within the field of view of the camera 108).

In some examples, the feature extraction network 410 also outputs a boom tip keypoint heatmap 412 containing a boom tip keypoint 414. The segmentation mask 416 is provided to a boom 2D to 3D transform 420 in the stage 402. The boom 2D to 3D transform 420 determines the boom position 262 of the aerial refueling boom 104 and, from which the boom tip position 260 will be determined in the stage 404. In some examples, the boom 2D to 3D transform 420 determines the boom tip position 260 directly. The boom 2D to 3D transform 420 uses a 3D boom model 426 (e.g., a computer-aided design (CAD) model), to generate an aircraft model projection 502, rendered according to the boom position 262. In some examples, the boom 2D to 3D transform 420 also generates the boom model projection 504 that is used by the video compilation 240. In some examples, the boom tip keypoint 414 (e.g., in the form of the boom tip keypoint heatmap 412) is also provided the boom 2D to 3D transform 420. In such examples, determining the position of the boom tip 106 on the aerial refueling boom 104 comprises fusing position information of the boom tip keypoint 414 with position information of the segmentation mask 416. In some examples, the boom 2D to 3D transform 420 uses a PnP algorithm.

The stage 403 uses a filter 430 to performing temporal filtering of the boom position 262 (or the boom tip position 260, if the boom 2D to 3D transform 420 determines the boom tip position 260 directly or if the stage 404 precedes the stage 403). In some examples, the temporal filtering comprises Kalman filtering that performs time-domain filtering across a time-series set of boom positions 262a (or boom tip positions). Thus, in some examples, the filter 430 operates across video frames (e.g., the video frame 202 and the plurality of additional video frames 202b). In some examples, the boom tip keypoint 414 is also temporally filtered, separately.

In some examples, the filter 430 also fuses proximity sensor measurements 432 of the aerial refueling boom 104, received from the proximity sensor 109. In such examples, determining the position of the boom tip 106 on the aerial refueling boom 104 comprises fusing the proximity sensor measurements 432 of the aerial refueling boom 104 with image-derived data of the aerial refueling boom 104 (e.g., the segmentation mask 416, the boom tip keypoints 414, the boom position 262, and/or the boom tip position 260). To accomplish this, in some examples, the filter 430 uses a trained network (e.g., an NN) to incorporate the proximity information into the filtering process.

Once the boom position 262 is known, in the stage 404, the boom tip position 260, which is in a predetermined location on the aerial refueling boom 104, may be determined using a position refinement algorithm 440 that uses the known position of the boom tip 106 on the aerial refueling boom 104. In some examples, the boom tip position 260 is further filtered with a temporal filter (which may be a Kalman filter). In some examples, the stage 404 precedes the stage 403. In some examples, such as when the boom 2D to 3D transform 420 determines the boom tip position 260 directly, the stage 404 is not needed.

The feature extraction network 410, the boom 2D to 3D transform 420, and the filter 430 are initially trained offline, prior to deployment, although some examples may employ on-going training during deployment. In some examples, the training uses approximately 20,000 labeled training images, generated by sweeping across ranges of 6DoF variations for the boom model 426. To increase variations in the datasets used for NN training, data augmentations may be randomly applied to each image passed to the NN.

FIG. 5 illustrates a video frame 500, in which the aircraft model projection 502 and the boom model projection 504 are both overlaid onto the video frame 202, over the aircraft 110 and the aerial refueling boom 104 (neither seen here, because of the overlays) for display to the human operator 242. The aircraft model projection 502 is generated using the aircraft model 326, rendered according to the aircraft position 232. The boom model projection 504 is generated using the boom model 426, rendered according to the boom position 262. In some examples, only one or the other of the aircraft model projection 502 and the boom model projection 504 is overlaid onto the video frame 202.

Figure 6:
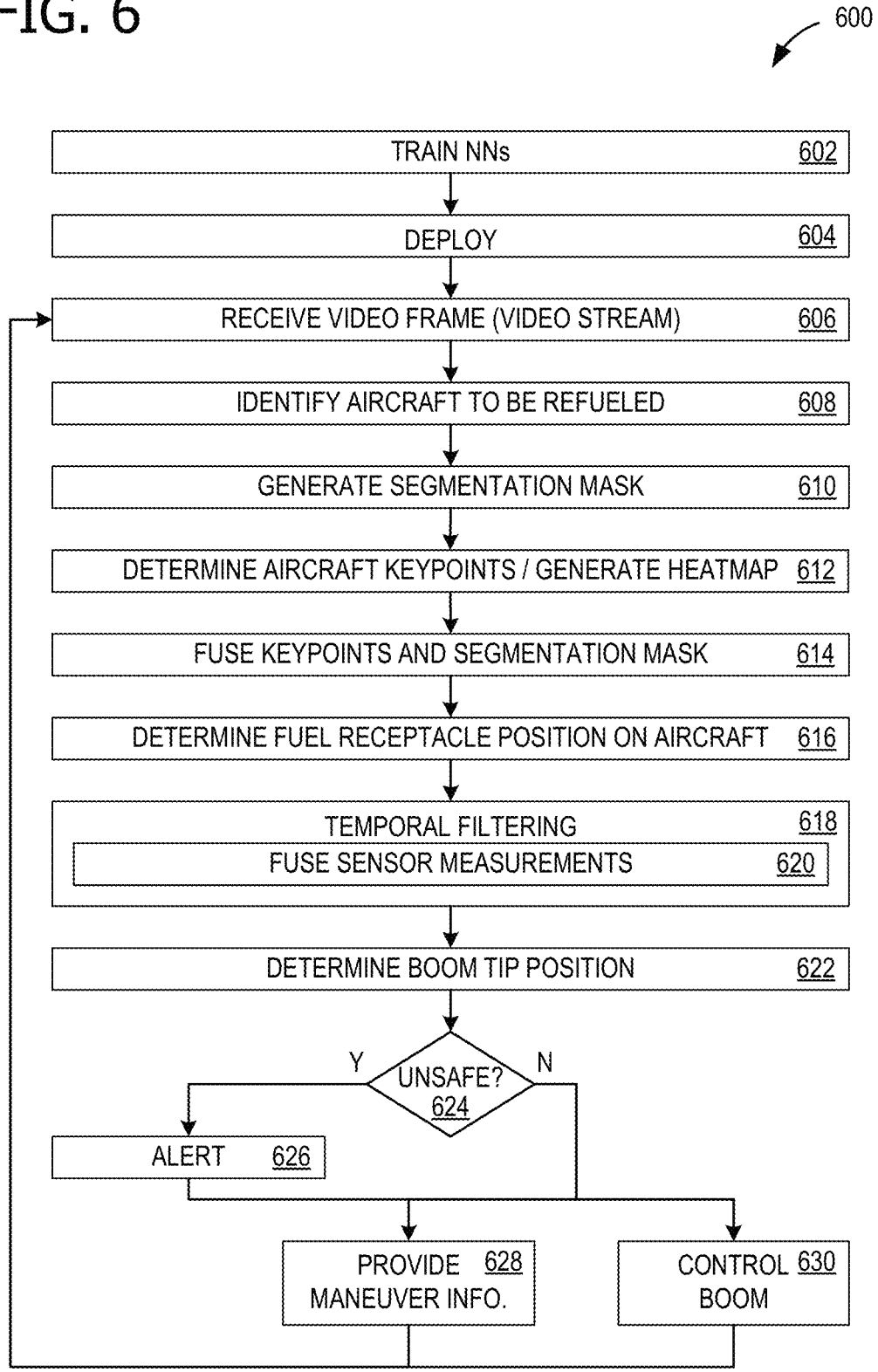
FIG. 6 is a flowchart 600 illustrating a method of feature detection for A3R, as can be used with the arrangement 100 of FIG. 1, in accordance with an example.

With reference now to FIG. 6, a flowchart 600 illustrates a method of air-to-air refueling (e.g., A3R or human-assisted air-to-air refueling) which may be used with the arrangement 100 of FIG. 1. In some examples, the operations illustrated in FIG. 6 are performed, at least in part, by executing instructions 802a (stored in the memory 802) by the one or more processors 804 of the computing device 800 of FIG. 8. For example, any of the feature extraction network 310, the filter 330, the aircraft 2D to 3D transform 320, the feature extraction network 410, the filter 430, the boom 2D to 3D transform 320, and any other ML component of the CV architecture 200 may be trained on a first example of the computing device 800 and then deployed on a second (different) example of the computing device 800.

Operation 602 includes training any networks and/or other ML components of the CV architecture 200. A plethora of different network types may be employed for image segmentation, keypoint extraction, position and pose estimation, filtering, and other operations described herein, including: NNs, FCNNs, CNNs, U-Net CNNs, region-based CNNs (RCNNs), faster RCNNs, mask RCNNs, keypoint RCNNs, and others. In some examples, operation 602 is performed prior to deployment 604, although in some examples, operation 602 remains ongoing during operational use of the CV architecture 200. Operation 606 includes receiving the video frame 202. In some examples, the video frame 202 is provided by a single camera (e.g., the camera 108). In some examples, the video frame 202 is monocular. Some examples include receiving the video stream 202a comprising the video frame 202 and the plurality of additional video frames 202b.

Operation 608 includes identifying, within the video frame 202, the aircraft 110 to be refueled. Operation 610 includes segmenting the video frame 202 to generate a segmentation mask 316 matching the aircraft 110 within the video frame 202. Operation 612 includes determining, within the video frame 202, the aircraft keypoints 314 for the aircraft 110. To accomplish this, some examples of operation 612 include generating the aircraft keypoint heatmap 312. Operation 614 includes fusing position information of the aircraft keypoints 314 with position information of the segmentation mask 316. Operation 616 includes, based on at least the segmentation mask 316, determining a position of the fuel receptacle 116 on the aircraft 110. In some examples, determining the position of the fuel receptacle 116 on the aircraft 110 comprises fusing position information of the aircraft keypoints 314 with position information of the segmentation mask 316.

In some examples, operation 616 includes determining the position of the aircraft 110 and, based on at least the position of the aircraft 110 (the aircraft position 232), determining the position of the fuel receptacle 116 (the fuel receptacle position 230) on the aircraft 110. In some examples, determining the position of the fuel receptacle 116 on the aircraft 110 comprises determining the position of the fuel receptacle 116 with 6DoF. In some examples, determining the position of the fuel receptacle 116 on the aircraft 110 comprises determining the position of the fuel receptacle 116 using a PnP algorithm. In some examples, determining the position of the fuel receptacle 116 on the aircraft 110 comprises determining the position of the fuel receptacle 116 using an NN.

Operation 618 includes performing temporal filtering of image-derived data of the aircraft 110 (e.g., the segmentation mask 316, the aircraft keypoints 314, the aircraft position 232, and/or the fuel receptacle position 230). In some examples, temporal filtering also, or instead, occurs prior to operation 616. In some examples, performing temporal filtering comprises performing Kalman filtering.

Some examples of operation 618 also include optional operation 620, which involves fusing proximity sensor measurements 332 of the aircraft 110 with image-derived data of the aircraft 110 (e.g., the segmentation mask 316, the aircraft keypoints 314, the aircraft position 232, and/or the fuel receptacle position 230). In some examples, the proximity sensor measurements 332 comprise lidar measurements or radar measurements. Thus, in some examples, determining the position of the fuel receptacle 116 on the aircraft 110 comprises fusing proximity sensor measurements 332 of the aircraft 110 with image-derived data of the aircraft 110.

Operation 622 includes determining the position of the boom tip 106 (the boom tip position 260) of the aerial refueling boom 104. In some examples, determining the boom tip position 260 (the position of the boom tip 106) of the aerial refueling boom 104 comprises detecting, within the video frame 202, the boom tip keypoint 414. In some examples, determining the boom tip position 260 comprises fusing the boom control parameters 220 for the boom the aerial refueling boom 104 with image-derived data of the aerial refueling boom 104 (e.g., the segmentation mask 416 and/or the boom tip keypoint 414). In some examples, determining the boom tip position 260 comprises, based on at least the boom control parameters 220, calculating the boom tip position 260. In some examples, operation 622 further includes performing temporal filtering of image-derived data of the boom tip. In some examples, temporal filtering also, or instead, occurs as part of operation 622. In some examples, performing temporal filtering comprises performing Kalman filtering.

A decision operation 624 identifies an unsafe condition. Decision operation 624 includes determining whether controlling the aerial refueling boom 104 to engage the fuel receptacle 116 is out of compliance with the safety parameters 214, using position information of the fuel receptacle 116 or the boom tip 106. If an unsafe condition exists, operation 626 generates the alert 216. The aircraft 110 (e.g., a pilot of the aircraft 110, or the aircraft's autonomous flight control, if the aircraft 110 is a UAV) is provided with the maneuvering information 218, in operation 628, for example to avoid a damaging collision of the aircraft 110 with the aerial refueling boom 104. Operation 628 includes providing, to the aircraft 110, maneuvering information to facilitate engaging the fuel receptacle 116 with the aerial refueling boom 104.

Operation 628 may also occur even when there is no unsafe condition, in some examples. Operation 630 includes, based on at least the position of the fuel receptacle 116 and the position of the boom tip, controlling the aerial refueling boom 104 to engage the fuel receptacle 116. In some examples, controlling the aerial refueling boom 104 to engage the fuel receptacle 116 comprises tracking a distance between the boom tip 106 and the fuel receptacle 116. In some examples, controlling the aerial refueling boom 104 to engage the fuel receptacle 116 comprises determining the boom control parameters 220 to close the distance between the boom tip 106 and the fuel receptacle 116. In situations in which there is unsafe condition, operation 630 may instead include controlling the aerial refueling boom 104 to avoid damaging the aircraft 110. The flowchart 600 returns to operation 606 for the next video frame 202 of the video stream 202*a*.

Figure 7:
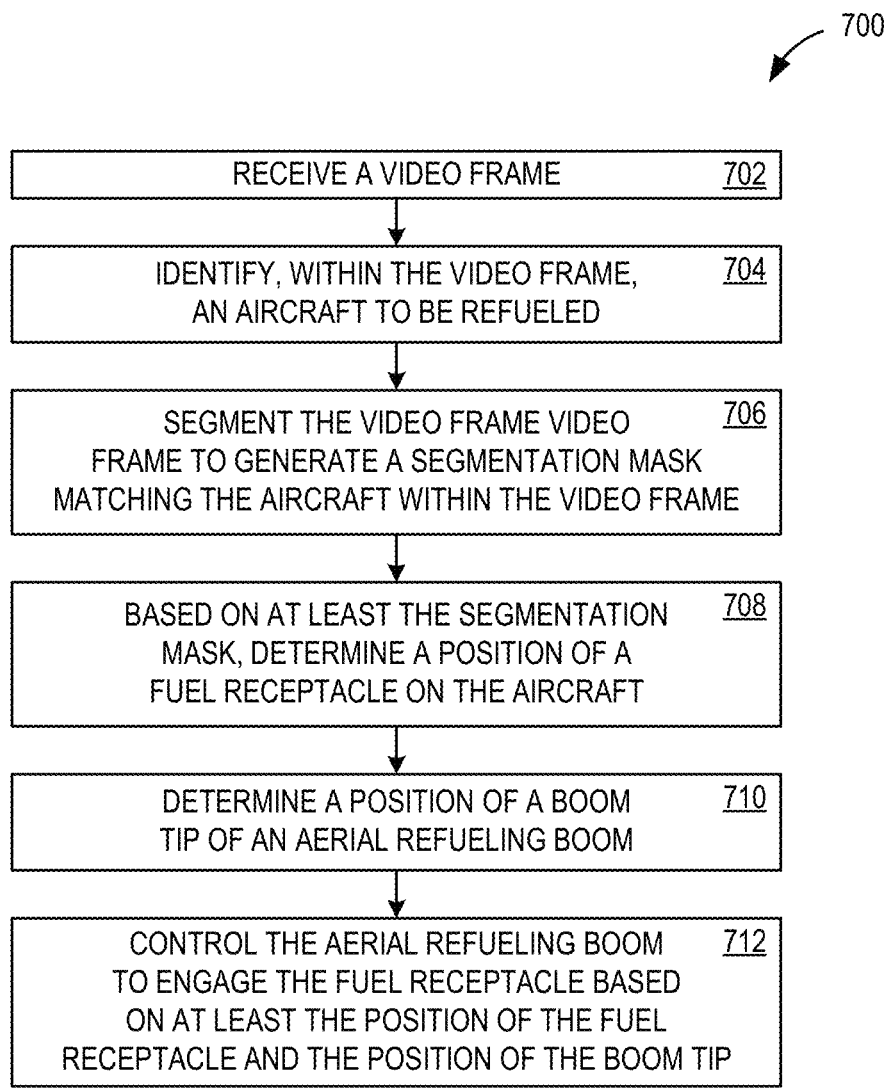
FIG. 7 is a flowchart 700 illustrating another method of feature detection for A3R, as can be used with the arrangement 100 of FIG. 1, in accordance with an example.

FIG. 7 shows a flowchart 700 illustrating a method of operating an aerial refueling boom according to the disclosure. In some examples, operations illustrated in FIG. 7 are performed, at least in part, by executing instructions by the one or more processors 804 of the computing device 800 of FIG. 8. Operation 702 includes receiving a video frame. Operation 704 includes identifying, within the video frame, an aircraft to be refueled. Operation 706 includes segmenting the video frame to generate a segmentation mask matching the aircraft within the video frame.

Operation 708 includes, based on at least the segmentation mask, determining a position of a fuel receptacle on the aircraft. Operation 710 includes determining a position of a boom tip of an aerial refueling boom. Operation 712 includes controlling the aerial refueling boom to engage the fuel receptacle based on at least the position of the fuel receptacle and the position of the boom tip.

Figure 8:
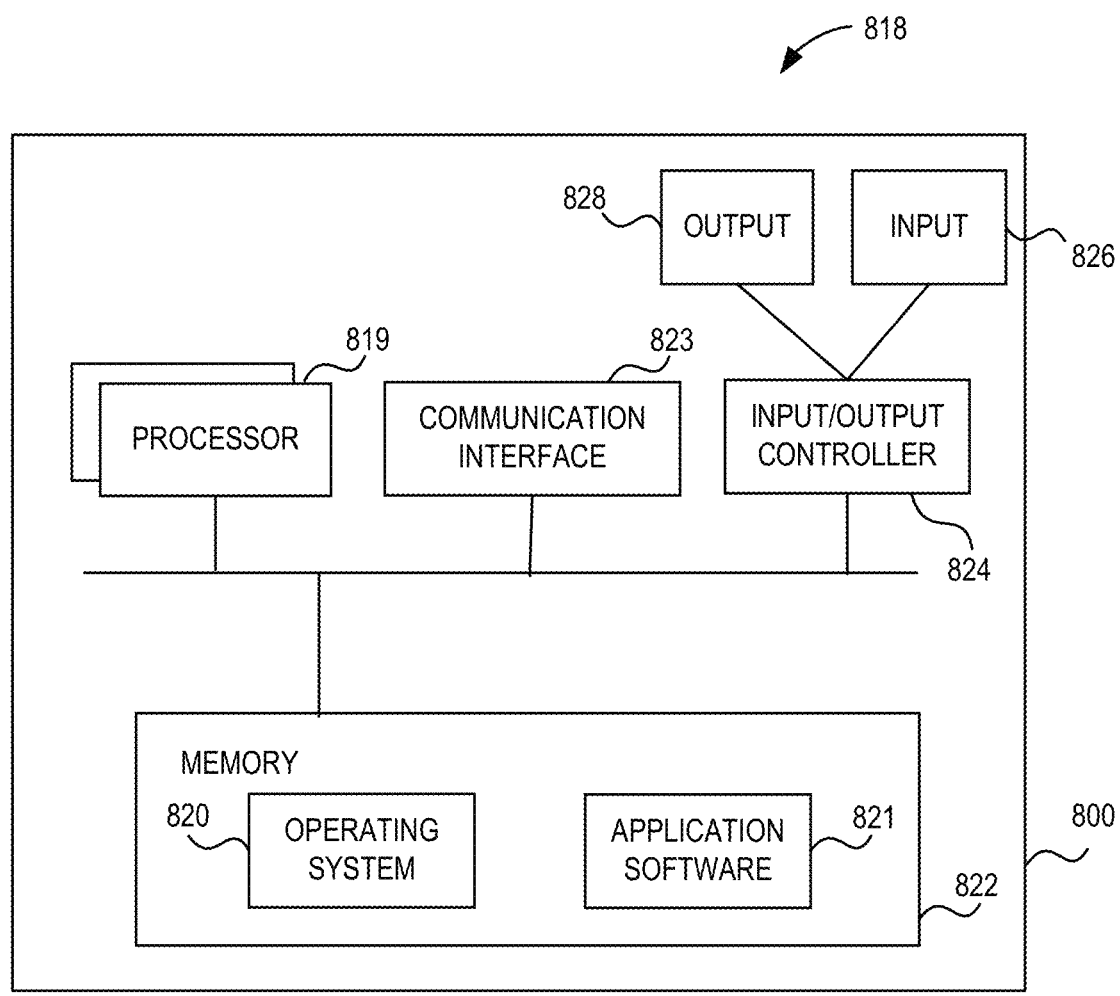
FIG. 8 is a block diagram of a computing device 800 suitable for implementing various aspects of the disclosure in accordance with an example.

The present disclosure is operable with an electronic device (i.e., a computing apparatus, computing device, etc.) according to an implementation as a functional block diagram of the computing device 800 in FIG. 8. In an implementation, components of a computing apparatus 818 are implemented as a part of an electronic device according to one or more implementations described in this specification. The computing apparatus 818 comprises one or more processors 819, for example microprocessors, controllers, and/or any other suitable type of processors for processing computer executable instructions to control the operation of the electronic device. In some implementations, platform software comprising an operating system 820 and/or any other suitable platform software is provided on the apparatus 818 to enable application software 821 to be executed on the device.

Computer executable instructions are provided using any computer-readable media that are accessible by the computing apparatus 818. Computer-readable media include, for example and without limitation, computer storage media such as a memory 822 and communications media. Computer storage media, such as a memory 822, include volatile and non-volatile, removable and non-removable, media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media embody computer readable instructions, data structures, program modules, and/or the like in a modulated data signal, such as a carrier wave and/or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that in some implementations the storage is distributed or located remotely and accessed via a network or other communication link (e.g. using a communication interface 823).

In some implementations, the computing apparatus 818 comprises an input/output controller 824 configured to output information to one or more output devices 825, for example a display and/or a speaker, which is separate from or integral to the electronic device. The input/output controller 824 is also configured, in some implementations, to receive and process an input from one or more input devices 826, for example, a keyboard, a microphone, and/or a touchpad. In one implementation, the output device 825 also acts as the input device. An example of such a device is a touch sensitive display. In some implementations, the input/output controller 824 also outputs data to devices other than the output device, e.g. a locally connected printing device. In some implementations, a user provides input to the input device(s) 826 and/or receives output from the output device(s) 825.

In some implementations, the functionality described herein is performed, at least in part, by one or more hardware logic components. According to an implementation, the computing apparatus 818 is configured by the program code when executed by the processor 819 to execute the implementations of the operations and functionality described. Alternatively, or in addition, the functionality described herein is performed, at least in part, by one or more hardware logic components. For example, and without limitation, illustrative types of hardware logic components include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs), and/or the like.

Although described in connection with the computing device 800, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one implementation, the computer-executable instructions are organized into one or more computer-executable components or modules. Generally, program modules include, but are not limited to, routines, programs, objects, components, and data structures that perform particular tasks or implement particular abstract data types. In one implementation, implementations of the disclosure are implemented with any number and organization of such components or modules. For example, implementations of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, implementations of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible, non-transitory, and mutually exclusive to communication media. Computer storage media are implemented in hardware and exclude carrier waves and propagated signals. Computer storage media for purposes of this disclosure are not signals per se. In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 9:
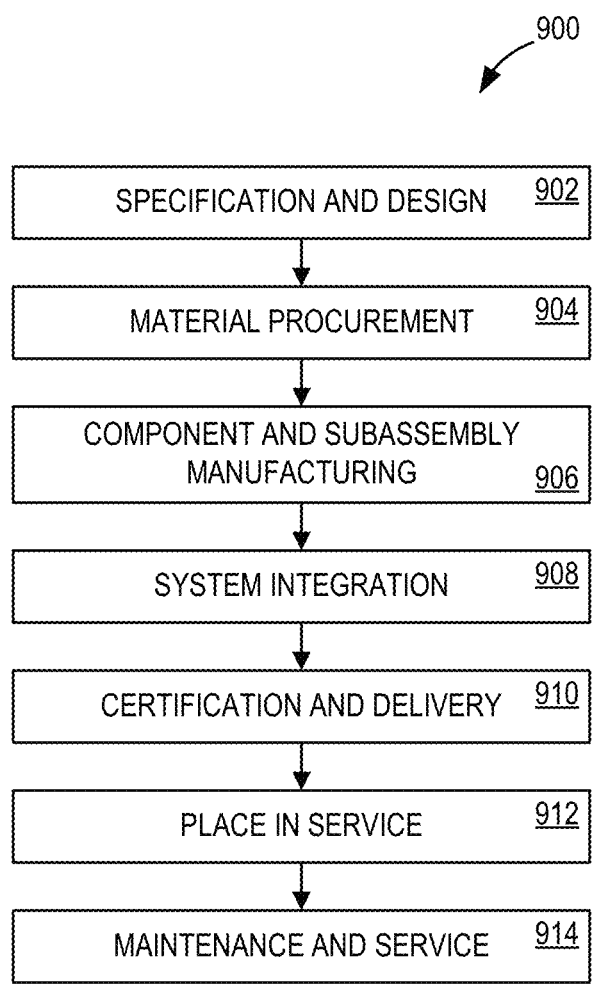
FIG. 9 is a block diagram of an apparatus production and service method 900 that employs various aspects of the disclosure in accordance with an example.

Some examples of the disclosure are used in manufacturing and service applications as shown and described in relation to FIG. 9. In FIG. 9, a diagram illustrating an apparatus manufacturing and service method 900 is depicted in accordance with an example. In one example, during pre-production, the apparatus manufacturing and service method 900 includes specification and design 902 and material procurement 904. During production, component, and subassembly manufacturing 906 and system integration 908 takes place. Thereafter, certification and delivery 910 occur in order to for the apparatus to be placed in service 912. While in service by a customer, routine maintenance and service 914 may include modification, reconfiguration, refurbishment, and other maintenance or service subject to configuration management, described herein.

In one example, each of the processes of the apparatus manufacturing and service method 900 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example method of air-to-air refueling comprises: receiving a video frame; identifying an aircraft to be refueled from within the video frame; segmenting the video frame to generate a segmentation mask matching the aircraft within the video frame; based on at least the segmentation mask, determining a position of a fuel receptacle on the aircraft; determining a position of a boom tip of the aerial refueling boom; and controlling the aerial refueling boom to engage the fuel receptacle based on at least the position of the fuel receptacle and the position of the boom tip.

An example system for operating an aerial refueling boom comprises: one or more processors; and a memory storing instructions that, when executed by the one or more processors, cause the one or more processors to perform operations comprising: receiving a video frame; identifying an aircraft to be refueled from within the video frame; segmenting the video frame to generate a segmentation mask matching the aircraft within the video frame; based on at least the segmentation mask, determining a position of a fuel receptacle on the aircraft; determining a position of a boom tip of the aerial refueling boom; and controlling the aerial refueling boom to engage the fuel receptacle based on at least the position of the fuel receptacle and the position of the boom tip.

An example computer program product comprises a computer usable medium having a computer readable program code embodied therein, the computer readable program code adapted to be executed to implement a method of operating an aerial refueling boom comprising: receiving a video frame; identifying an aircraft to be refueled from within the video frame; segmenting the video frame to generate a segmentation mask matching the aircraft within the video frame; based on at least the segmentation mask, determining a position of a fuel receptacle on the aircraft; determining a position of a boom tip of the aerial refueling boom; and controlling the aerial refueling boom to engage the fuel receptacle based on at least the position of the fuel receptacle and the position of the boom tip.

Alternatively, or in addition to the other examples described herein, examples include any combination of the following:

the video frame is provided by a single camera;
the video frame is monocular;
a camera, wherein the video frame is provided by the camera;
receiving a video stream comprising the video frame and a plurality of additional video frames;
determining, within the video frame, aircraft keypoints for the aircraft;
generating an aircraft keypoint heatmap;
determining the position of the fuel receptacle on the aircraft comprises fusing position information of the aircraft keypoints with position information of the segmentation mask;
determining the position of the fuel receptacle on the aircraft comprises fusing proximity sensor measurements of the aircraft with image-derived data of the aircraft;
based on at least the position of the aircraft (the aircraft position), determining the position of the fuel receptacle (the fuel receptacle position) on the aircraft;
determining the position of the fuel receptacle on the aircraft comprises determining the position of the fuel receptacle with 6DoF;
determining the position of the fuel receptacle on the aircraft comprises determining the position of the fuel receptacle using a PnP algorithm;
determining the position of the fuel receptacle on the aircraft comprises determining the position of the fuel receptacle using an NN;
determining the position of the fuel receptacle on the aircraft comprises determining the position of the aircraft;
determining the position of the fuel receptacle on the aircraft comprises fusing proximity sensor measurements of the aircraft with the merged aircraft keypoints;
the proximity sensor measurements comprise lidar measurements or radar measurements;
performing temporal filtering of image-derived data of the aircraft (e.g., the segmentation mask, the aircraft keypoints, the aircraft position, and/or the fuel receptacle position);
performing temporal filtering comprises performing Kalman filtering;
determining the position of the boom tip (the boom tip position) comprises, based on at least the boom control parameters, calculating the boom tip position;
determining the position of the boom tip of the aerial refueling boom comprises determining, within the video frame, the boom tip keypoint;
determining the boom tip position comprises fusing the boom control parameters for the boom with image-derived data of the boom (e.g., the segmentation mask and/or the boom tip keypoint);
performing temporal filtering of image-derived data of the boom tip;
determining the boom tip position comprises, based on at least the boom control parameters, calculating the boom tip position;
training networks and/or other ML components of the CV architecture;
a proximity sensor;
determining whether controlling the aerial refueling boom to engage the fuel receptacle is out of compliance with safety parameters, using position information of the fuel receptacle or the boom tip;
based on at least determining that controlling the aerial refueling boom to engage the fuel receptacle is to engage the fuel receptacle is out of compliance with safety parameters, generating an alert;
controlling the aerial refueling boom to engage the fuel receptacle comprises tracking a distance between the boom tip and the fuel receptacle;
controlling the aerial refueling boom to engage the fuel receptacle comprises determining boom control parameters to close the distance between the boom tip and the fuel receptacle;
controlling the aerial refueling boom to avoid damaging the aircraft;
a boom control that controls the aerial refueling boom to engage the fuel receptacle; and
providing, to the aircraft, maneuvering information to facilitate engaging the fuel receptacle with the aerial refueling boom.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of operating an aerial refueling boom, the method comprising: receiving a video frame;
   identifying an aircraft to be refueled from within the video frame;
   segmenting the video frame to generate an aircraft segmentation mask matching the aircraft within the video frame, wherein the segmenting of the video frame includes linking each pixel in the video frame to one of a plurality of class labels, and wherein the plurality of class labels include an aircraft label, a boom label and a background label;
   based on at least the aircraft segmentation mask, determining a position of a fuel receptacle on the aircraft;
   determining a position of a boom tip of the aerial refueling boom based on a boom segmentation mask generated from the segmenting of the video frame; and
   controlling the aerial refueling boom to engage the fuel receptacle based on at least the position of the fuel receptacle and the position of the boom tip.

2. The method of claim 1, wherein the video frame is provided by a single camera.

3. The method of claim 1, further comprising:
   providing, to the aircraft, maneuvering information to facilitate engaging the fuel receptacle with the aerial refueling boom.

4. The method of claim 1, further comprising:
   determining whether controlling the aerial refueling boom to engage the fuel receptacle is out of compliance with safety parameters, using position information of the fuel receptacle or the boom tip; and
   based on at least determining that controlling the aerial refueling boom to engage the fuel receptacle is to engage the fuel receptacle is out of compliance with safety parameters, generating an alert.

5. The method of claim 1, further comprising:
   determining, within the video frame, aircraft keypoints for the aircraft, wherein determining the position of the fuel receptacle on the aircraft comprises fusing position information of the aircraft keypoints with position information of the aircraft segmentation mask; and
   determining, within the video frame, a boom tip keypoint, wherein determining the position of the boom tip comprises fusing position information of the boom tip keypoint with position information of the boom segmentation mask.

6. The method of claim 1, further comprising:
   generating an aircraft keypoint heatmap.

7. The method of claim 1, further comprising:
   performing temporal filtering of image-derived data of the aircraft.

8. The method of claim 1, wherein determining the position of the fuel receptacle on the aircraft comprises:
   fusing proximity sensor measurements of the aircraft with image-derived data of the aircraft.

9. A system for operating an aerial refueling boom, the system comprising: one or more processors; and
   a memory storing instructions that, when executed by the one or more processors, cause the one or more processors to perform operations comprising:
   receiving a video frame;
   identifying an aircraft to be refueled from within the video frame;
   segmenting the video frame to generate an aircraft segmentation mask matching the aircraft within the video frame, wherein the segmenting of the video frame includes linking each pixel in the video frame to one of a plurality of class labels, and wherein the plurality of class labels include an aircraft label, a boom label and a background label;
   based on at least the aircraft segmentation mask, determining a position of a fuel receptacle on the aircraft;
   determining a position of a boom tip of the aerial refueling boom based on a boom segmentation mask generated from the segmenting of the video frame; and
   controlling the aerial refueling boom to engage the fuel receptacle based on at least the position of the fuel receptacle and the position of the boom tip.

10. The system of claim 9, further comprising:
    a boom control that controls the aerial refueling boom to engage the fuel receptacle.

11. The system of claim 9, further comprising:
    a camera, wherein the video frame is provided by the camera.

12. The system of claim 9, further comprising:
    a proximity sensor, wherein determining the position of the fuel receptacle on the aircraft comprises:
    fusing proximity sensor measurements of the aircraft with image-derived data of the aircraft.

13. The system of claim 9, wherein the video frame is provided by a single camera.

14. The system of claim 9, wherein the operations further comprise:
    providing, to the aircraft, maneuvering information to facilitate engaging the fuel receptacle with the aerial refueling boom.

15. The system of claim 9, wherein the operations further comprise:
    generating an aircraft keypoint heatmap.

16. A computer program product, comprising a computer usable medium having a computer readable program code embodied therein, the computer readable program code adapted to be executed to implement a method of operating an aerial refueling boom, the method comprising:
    receiving a video frame;
    identifying an aircraft to be refueled from within the video frame;
    segmenting the video frame to generate an aircraft segmentation mask matching the aircraft within the video frame, wherein the segmenting of the video frame includes linking each pixel in the video frame to one of a plurality of class labels, and wherein the plurality of class labels include an aircraft label, a boom label and a background label;
    based on at least the aircraft segmentation mask, determining a position of a fuel receptacle on the aircraft;
    determining a position of a boom tip of the aerial refueling boom based on a boom segmentation mask generated from the segmenting of the video frame; and
    controlling the aerial refueling boom to engage the fuel receptacle based on at least the position of the fuel receptacle and the position of the boom tip.

17. The computer program product of claim 16, wherein the video frame is monocular.

18. The computer program product of claim 16, wherein the method further comprises: fusing proximity sensor measurements of the aircraft with image-derived data of the aircraft.

19. The computer program product of claim 16, wherein the method further comprises: determining whether controlling the aerial refueling boom to engage the fuel receptacle is out of compliance with safety parameters, using position information of the fuel receptacle or the boom tip; and based on at least determining that controlling the aerial refueling boom to engage the fuel receptacle is to engage the fuel receptacle is out of compliance with safety parameters, generating an alert.

20. The computer program product of claim 16, wherein the method further comprises:
   determining, within the video frame, aircraft keypoints for the aircraft, wherein determining the position of the fuel receptacle on the aircraft comprises fusing position information of the aircraft keypoints with position information of the aircraft segmentation mask; and
   determining, within the video frame, a boom tip keypoint, wherein determining the position of the boom tip comprises fusing position information of the boom tip keypoint with position information of the boom segmentation mask.

* * * * *